United States Patent
Ayyagari et al.

(10) Patent No.: US 7,589,636 B2
(45) Date of Patent: Sep. 15, 2009

(54) METHODS AND SYSTEMS FOR AUTOMATED SAFETY DEVICE INSPECTION USING RADIO FREQUENCY IDENTIFICATION

(75) Inventors: Arun Ayyagari, Seattle, WA (US);
Craig Battles, Seattle, WA (US);
William Phillip Coop, Kent, WA (US);
Kevin Y. Ung, Bellevue, WA (US);
Brian J. Smith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 379 days.

(21) Appl. No.: 11/553,575

(22) Filed: Oct. 27, 2006

(65) Prior Publication Data

US 2008/0100450 A1    May 1, 2008

(51) Int. Cl.
*G08B 13/14* (2006.01)
(52) U.S. Cl. ............... 340/572.7; 340/572.1; 340/10.1; 340/505; 340/539.13; 340/572.8
(58) Field of Classification Search ............. 340/572.1, 340/572.7, 572.4, 5.92, 10.1, 505, 573.1, 340/593.13, 572.8
See application file for complete search history.

(56) References Cited

U.S. PATENT DOCUMENTS 6,134,448 A    10/2000  Shoji et al.
6,600,418 B2 *  7/2003  Francis et al. ............ 340/572.1
7,116,988 B2   10/2006  Dietrich et al.
7,242,303 B2 *  7/2007  Patel et al. ................ 340/572.4
7,267,262 B1 *  9/2007  Brown ......................... 235/375
2003/0146871 A1  8/2003  Karr et al.
2004/0069851 A1  4/2004  Grunes et al.
2005/0285790 A1 12/2005  Gagnon
2006/0128503 A1  6/2006  Savarese et al.

OTHER PUBLICATIONS

International Search Report for PCT/US2007/080194; Apr. 10, 2008; 13 pages.

* cited by examiner

*Primary Examiner*—Anh V La
(74) *Attorney, Agent, or Firm*—Armstrong Teasdale LLP

(57) ABSTRACT

Methods and systems for an automated safety device inspection system for a vehicle are provided. The system includes an RFID reader including a transmit portion and a receive portion wherein the reader is physically translatable along a predetermined path, a directional antenna communicatively coupled to the reader wherein the antenna is configured to transmit and receive radio frequency (RF) signals in a direction substantially normal to the path, a relative position indicator configured to determine a relative position of the reader from a starting point, and a controller communicatively coupled to the reader. The controller includes a user interface, a processor communicatively coupled to the user interface, and a database communicatively coupled to the processor wherein the database includes location data of a plurality of safety devices in a plurality of different types of vehicles, the processor is configured to control the transmitted RF signals based on the location data.

38 Claims, 4 Drawing Sheets

_US 7,589,636 B2_

METHODS AND SYSTEMS FOR AUTOMATED SAFETY DEVICE INSPECTION USING RADIO FREQUENCY IDENTIFICATION

BACKGROUND OF THE INVENTION

This invention relates generally to automated inspection systems, and more particularly, to systems and methods for monitoring a presence and/or condition of components using RFID systems and other sensor motes.

At least some known airlines are governed by government and/or safety regulations that require each airplane seat is properly equipped with a floatation device for use by the passenger in the unlikely event of a water landing. A current known airplane inspection process to verify that each seat has the requisite floatation device is time consuming and labor intensive. The inspection process requires a person, to check underneath each seat or a compartment beside the seat, to verify that there is a floatation device and also ensure that its expiration date is within acceptable limits in accordance with the governing regulations. Some airplanes may be configured with hundreds of seats such that the inspection process for each seat would have to be repeated for every seat leading to the time consuming and labor intensive characteristics of the process. Furthermore, due to the labor intensive characteristic, the process is prone to possible errors and thereby requiring additional cross-checks as deemed appropriate. The time consuming characteristic of the floatation device check may also adversely impact airplane turn-around time thereby mitigating its utilization efficiency. Therefore, both the time consuming and labor intensive nature of the manual airplane inspection process for floatation device check result in increased operational costs.

Currently, life vests can be detected on the airplane by attaching an RFID tag onto the vest. By this method, an RFID reader can detect the plurality of life vests on the airplane, and by counting, can determine that all required vests are on the plane. This does not determine that all vests are properly stowed, as stolen items placed in passengers' baggage or misplaced vests are still detected. Further, numerous signals are received from all the RFID tags attached to all the seats in the "view" of the reader.

Currently, life vest tampering can be detected by placing a frangible RFID tag on the life vest pocket, such that removing the life vest destroys the RFID tag. Again, an RFID reader can detect the life vests on the airplane, and can, by counting, verify that all the required vests are present and not tampered with. However, the stolen vest cannot be detected at all, and the problem of multiple signals remains.

BRIEF DESCRIPTION OF THE INVENTION

In one embodiment, an automated safety device inspection system for a vehicle includes an RFID reader including a transmit portion and a receive portion wherein the reader is physically translatable along a predetermined path, a directional antenna communicatively coupled to the reader wherein the antenna is configured to transmit and receive radio frequency (RF) signals in a direction substantially normal to the path, a relative position indicator configured to determine a relative position of the reader from a starting point, and a controller communicatively coupled to the reader. The controller includes a user interface, a processor communicatively coupled to the user interface, and a database communicatively coupled to the processor wherein the database includes location data of a plurality of safety devices in a plurality of different types of vehicles, the processor is configured to control the transmitted RF signals based on the location data.

In another embodiment, a method for automated location of an object includes traversing a reader in a first direction along a path adjacent the object, transmitting an interrogation signal from the reader in a direction substantially normal to the first direction, transmitting a response signal from the object when the object receives the interrogation signal, and determining a presence of the object, an identification of the object and a location of the object based on the response signal.

In yet another embodiment, an automated inspection system includes a radio frequency identification (RFID) reader including a transmit portion and a receive portion wherein the reader is physically translatable along a predetermined path and wherein the RFID reader is configured to generate radio frequency signals that interrogate an RFID enabled tag such that the tag responds to the interrogation with a tag identification signal. The system also includes a directional antenna communicatively coupled to the reader wherein the antenna is configured to transmit and receive radio frequency (RF) signals in a direction substantially normal to the path and wherein the directional antenna is further configured to generate a narrow beamwidth selected to ensure that the tags are within the field of view of the antenna beam. The system further includes a relative position indicator configured to determine a relative position of the reader from a starting point and a controller communicatively coupled to the reader. The controller includes a user interface, a processor communicatively coupled to the user interface wherein the processor is configured to determine an RFID-enabled tag location based on the relative position of the reader and a received signal strength indicator (RSSI) signal received from the reader, the processor is further configured to determine an RFID-enabled tag location based on the relative position of the reader, and a time difference of arrival (TDOA) signal from the reader, the processor is still further configured to determine an RFID-enabled tag location based on the position-stamps of the plurality of received RF signals, and a database communicatively coupled to the processor, the database including location data of a plurality of safety devices in a plurality of different types of vehicles, the processor configured to control the transmitted RF signals based on the location data.

DETAILED DESCRIPTION OF THE INVENTION

Many specific details of certain embodiments of the invention are set forth in the following description in order to provide a thorough understanding of such embodiments. One skilled in the art, however, will understand that the present invention may have additional embodiments, or that the present invention may be practiced without several of the details described in the following description.

Figure 1:
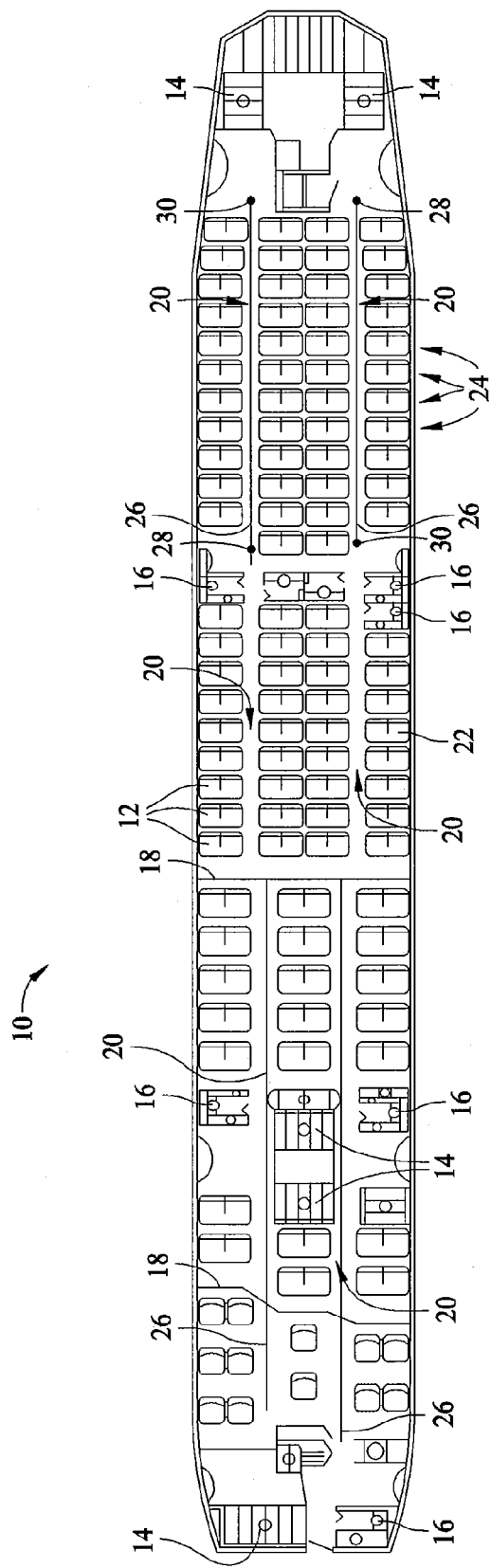
FIG. 1 is a schematic plan view of an exemplary fuselage of an aircraft in accordance with an embodiment of the present invention.

FIG. 1 is a schematic plan view of an exemplary fuselage of an aircraft 10 in accordance with an embodiment of the present invention. Aircraft 10 includes a plurality of internal equipment arranged in one of a plurality of configurations. For example, passenger seats 12, galleys 14, lavatories 16, and bulkheads 18 may be arranged in configurations designed to accommodate different passenger class areas and service requirements. Passenger seats 12 are generally arranged in a configuration that permits access to an aisle 20 from no more than two or three seats away. In the exemplary embodiment, passenger seats 12 comprise a pair of seats fabricated together to form a seat assembly 22. Seat assemblies 22 are grouped together in such a manner that aisles 20 and a space accommodating passengers' legs are formed. A pitch of seat assemblies 22 between each row 24 of seat assemblies is dependent on the space selected for accommodating passengers' legs. In various passenger class areas, seats 12 and spacing between seat assemblies 22 may be different. An aircraft configuration details the placement of the interior equipment and in particular the position of seat assemblies 22. The configuration of the aircraft internal equipment may be changed to accommodate a change in service for the aircraft. Aisles 20 define a path 26 that include a starting point 28 and an ending point 30.

In the exemplary embodiment, each seat 12 includes a flotation device or life vest (not shown) for use by the passenger seated in seat 12 in a case of an emergency landing in water. Safety and government regulations generally require a check of the presence of a life vest for each seat and an efficiency of each life vest as demonstrated typically by an expiration date associated with each life vest. The life vest is typically stowed under seat 12 or in an armrest associated with seat 12. As described above, a manual check of each life vest is labor intensive and time consuming. Simply applying a sensor mote such as an RFID-enabled tag to each life vest can identify that one or more life vests are missing or tampered with, but cannot localize the missing or tampered with life vest, still requiring a manual check of at least some of the life vest locations to determine which of the life vests that are missing or tampered with.

Figure 2:
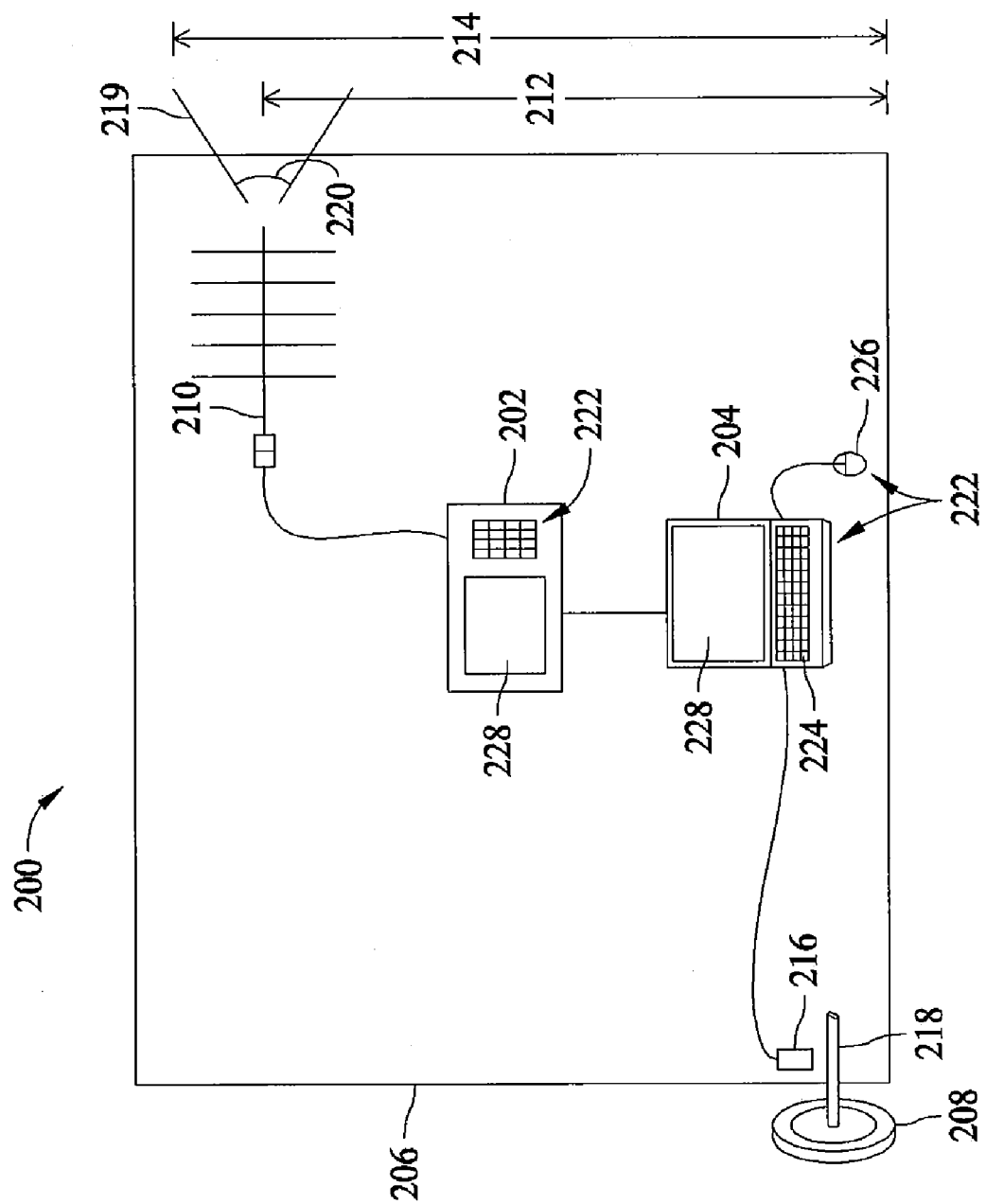
FIG. 2 is a schematic view of an exemplary automated floatation device checking system in accordance with an embodiment of the present invention.

FIG. 2 is a schematic view of an exemplary automated floatation device checking system 200 in accordance with an embodiment of the present invention. Automated floatation device checking system, includes a mobile RFID tag reader 202 and a computing system 204, that are mounted on a cart 206 that can be traversed along path 26 from starting point 28 to ending point 30, usually by rolling cart 206 on a pair of wheels 208 (only one wheel 208 shown in FIG. 2). automated floatation device checking system 200 includes a directional antenna 210 communicatively coupled to RFID tag reader 202 and mounted substantially perpendicularly to path 26, i.e., perpendicular to aisle 20, at a first height 212 of a seat underside, where the floatation devices are located. Height 212 is adjustable to position antenna 210 at a second height 214, of a seat armrest for use with seats in for example, business class where fewer seats in a row and wider seats permit stowing the flotation devices in the seat armrests.

In the exemplary embodiment, cart 206 includes a rotary position transducer 216 coupled proximate wheel 208 or a shaft 218 coupled to wheel 208. Rotary position transducer 216 is communicatively coupled to computing system 204 to enable a relative position of cart 206 along path 26 to be determined.

In the exemplary embodiment, antenna 210 is a directional antenna such as a horn antenna or a Yagi antenna capable of radiating an RF beam 219 having a predetermined angular beamwidth 220, of for example, between approximately ten degrees and approximately twenty-five degrees such as approximately seventeen degrees. In an alternative embodiment, antenna 210 is an active directional antenna such as a such as phased-array antenna having a beamwidth that is selectable by changing phase angles of excitation signals fed into individual elements of the active electronically phased array antenna. The beamwidth is selectable based on the configuration of the interior equipment of the aircraft. For example, in one embodiment, a beamwidth is selected based on a configuration that includes three seats in a row of seats, a seat pitch and width of approximately thirty inches, and a standoff distance between antenna 210 and a seat edge of approximately ten inches.

Mobile RFID tag reader 202 and antenna 210 are configured to transmit with a selectable Effective Isotropic Radiated Power (EIRP) to ensure desired signal attenuation/roll-off at a predetermined distance, for example, a distance that approaches link budget limits. In the exemplary embodiment, a distance of approximately one-hundred inches is assumed. During traversing of cart 206 along path 26, RFID tags associated with floatation devices under seats that are not in the field-of-view (FOV) of reader 202 and antenna 210 are not powered-up and do not enter a tag ready state. Reader 202 interrogates the tags when triggered by computing system 204. In one embodiment, reader 202 interrogates the tags when antenna 210 is adjacent a row of seats based on an input from rotary position transducer 216.

During operation, a user selects the seat layout configuration for the aircraft being scanned using a user interface (UT) 222 associated with reader 202 or computing system 204. In the exemplary embodiment, UT 222 includes a keyboard 224, a mouse 226, and a display screen 228. UT 22 displays the selected seat layout configuration on display 228. The user is prompted to position cart 206 at a selected starting position 28 for a selected path 26 and the user then indicates that cart 206 is positioned in the position indicated on display 228. Alternatively, the user positions cart 206 at a selected location in the aircraft and indicates such position on the seat layout configuration on display 228. The location of cart 206 is displayed on the seat layout configuration display 228.

Computing system 204 maintains a relative position of cart 206 based on an input from rotary position transducer 216. The position of cart is be initialized to a defined point within aisle 26 by selecting a corresponding point on the seat layout configuration display 228. Computing system 204 automatically configures reader 202 to transmit EIRP based on the selected seat layout configuration. Computing system 204 is pre-calibrated for seat layout configurations for a plurality of different aircraft and their respective seating classes.

Upon user initiation computing system 206 triggers RFID reader 220 to interrogate and read the RFID tags coupled to flotation devices at each seat when the cart is at a predetermined seat row or cluster such that the RFID tag reads are synchronized to seat cluster locations. Unique RFID tags read per seat cluster are displayed on the seat layout configuration UI. Upon completion of scanning path 26 computing system 204 displays at least a pass/fail indication for the aircraft. If the flotation device check fails, computing system 204 displays the seat(s) identification having missing, tampered with, or expired floatation device(s).

Although described herein in the context of an RFID-enabled system, system 200 may comprise any number of other sensor motes and readers capable of performing the functions described herein.

Figure 3:
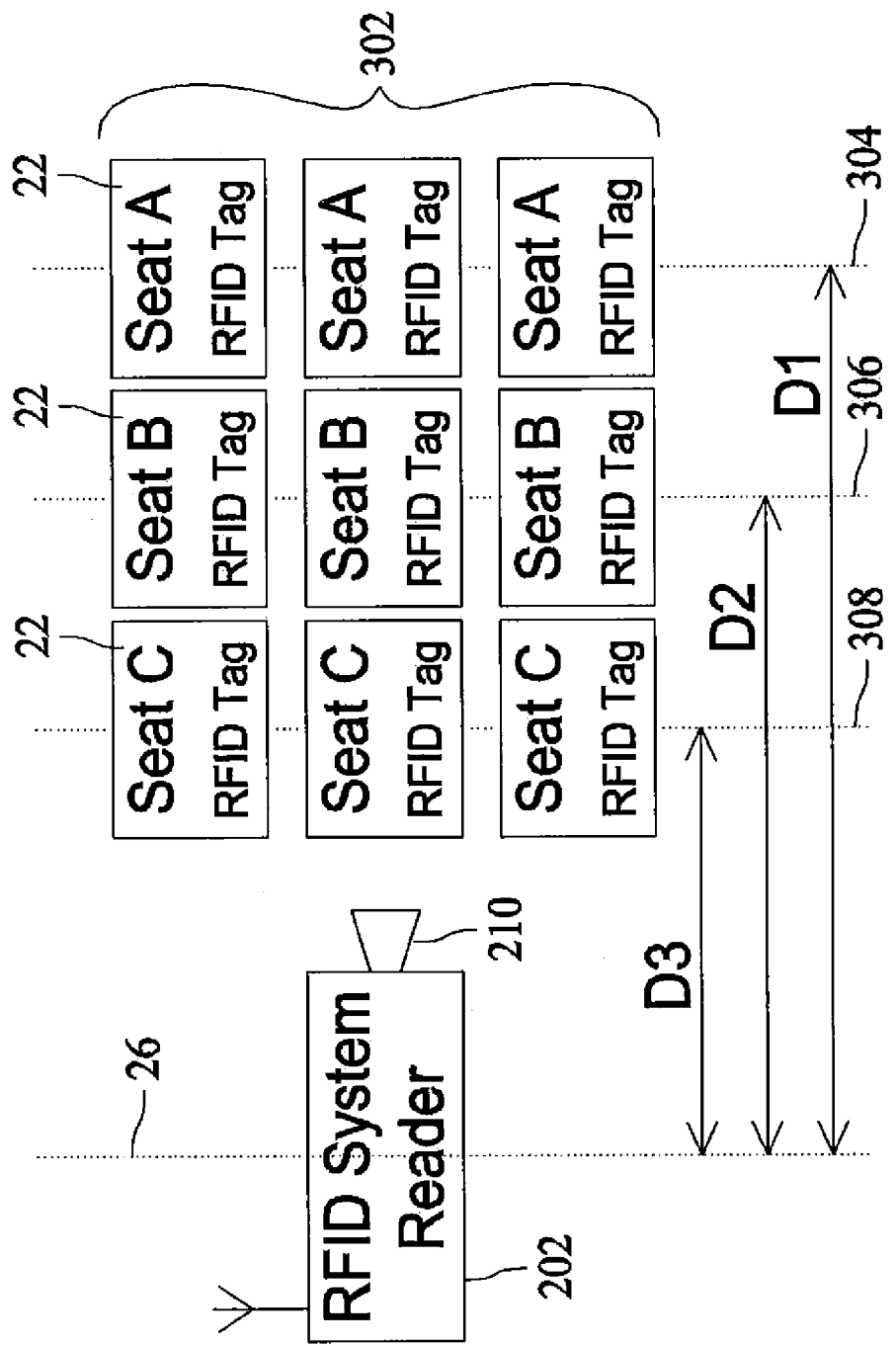
FIG. 3 is a schematic view of an exemplary portion of an aircraft interior during a scan using the automated floatation device checking system 200 shown in FIG. 2.

FIG. 3 is a schematic view of an exemplary portion of an aircraft interior during a scan using automated floatation device checking system 200 (shown in FIG. 2). A plurality of seats 22 being scanned may be treated as a seat cluster 302. In the exemplary embodiment, three seats 22 across row 24 by three rows comprise a cluster 302. Seats 22 are identified similarly as seats 22 are identified in an aircraft, for example, seat A being closest to a window of the aircraft, seat B being a middle seat, and seat C being an aisle seat. Each seat 22 includes a distance between a seat axial centerline and path 26. In the exemplary embodiment, the A seats are positioned a distance D1 from path 26, the B seats are positioned a distance D2 from path 26, and the C seats are positioned a distance D3 from path 26. The distances D1, D2, and D3 are predetermined based on the seating configuration of the aircraft interior.

Figure 4:
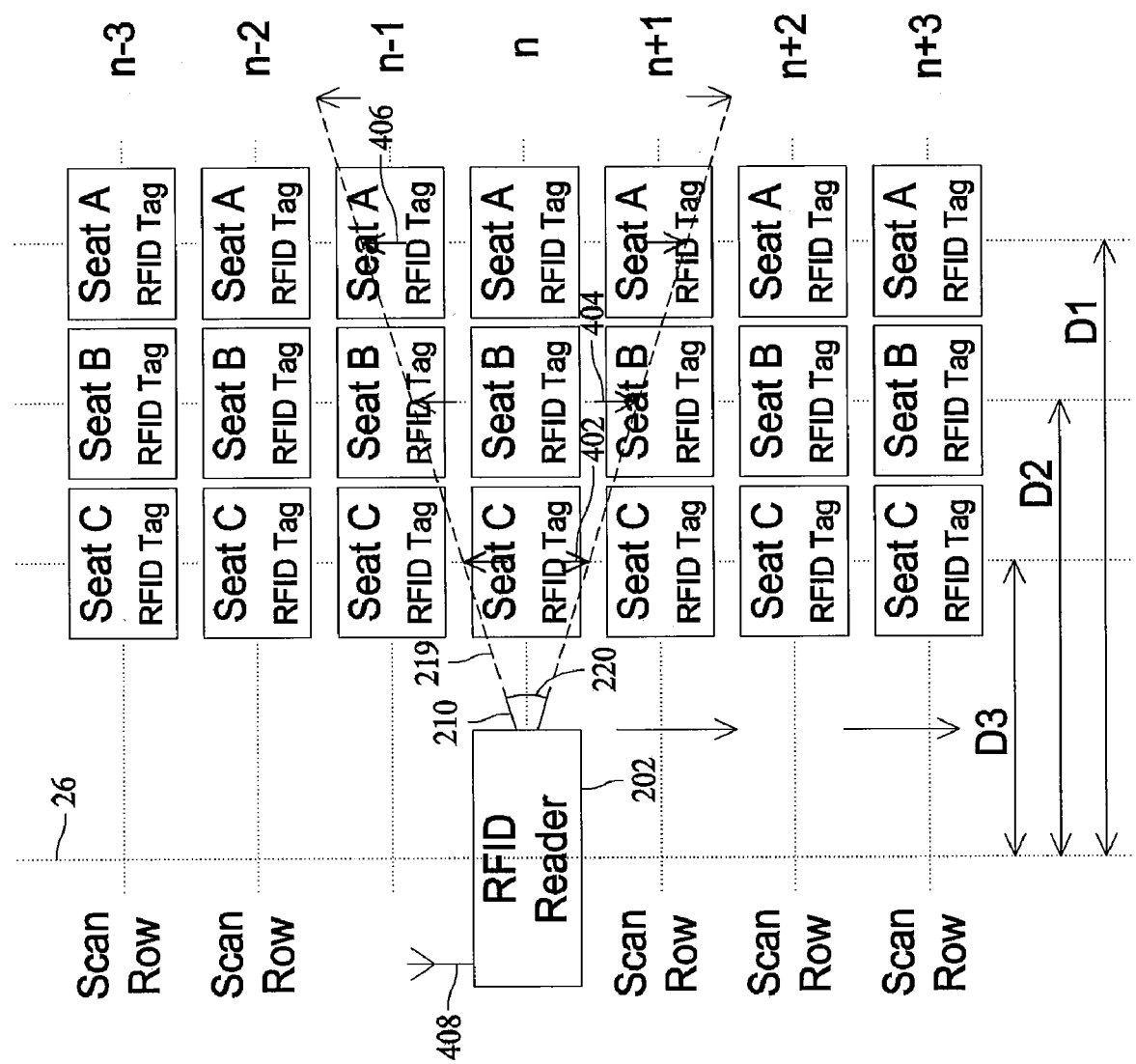
FIG. 4 is a schematic view of another exemplary portion of the aircraft interior during a scan using the automated floatation device checking system shown in FIG. 2.

FIG. 4 is a schematic view of another exemplary portion of an aircraft interior during a scan using automated floatation device checking system 200 (shown in FIG. 2). In the exemplary embodiment, reader 202 is configured to selectably radiate beam 219 using antenna 210 toward seats 22 adjacent to reader 202. Because beam 219 is diverging from antenna 210, a width 402 of beam 219 at distance D3 is less than a width 404 of beam 219 at distance D2, and a width 406 of beam 219 at distance D1 is less than width 404. Accordingly, a strength of beam 219 is less at D1 than at D2 or D3. Conversely the width of beam 219 is greatest at D1 and least at D3. Width 406 is large enough that more than just the RFID tags in the row adjacent to antenna 210 may be interrogated by a signal from reader 202. Beam 219 is controlled to manage RF beamwidth, link budget, and propagation characteristics to be closer to a Rician fading model than Rayleigh fading model such that a strong dominant component is present and minimize the degree of multi-path signals. This dominant component can for example be the line-of-sight wave extending from antenna 210. As used herein, a link budget is an accounting of all of the gains and losses from reader 202, through the medium to the RFID tag. link budget takes into account the attenuation of the transmitted signal due to propagation, as well as the loss, or gain, due to the antenna.

To determine a location of an RFID tag and its associated flotation device several methods are described in detail below. In one embodiment, a position-stamping accounting method is used. By an accurate accounting of position-stamps of each detected RFID tag during a scan a location of each RFID tag can be determined. In another embodiment, a Received Signal Strength Indicator (RSSI) method is used to associate a response from a floatation device RFID tag to an associated seat within a seat cluster and in yet another embodiment, a Time Difference Of Arrival (TDOA) method is used to associate a response from a floatation device RFID tag to an associated seat within a seat cluster.

As illustrated in FIG. 4, as reader 202 is traversed along path 26 in a direction 408 and is adjacent a row n, it can be seen that due to the geometry of beam 219, additional RFID tags other than just the tags in row n may be illuminated by beam 219. For example, an RFID tag associated with the flotation device at seat A in the n+1 row and the n−1 rows may also be illuminated by beam 219. Similarly, an RFID tag associated with the flotation device at seat B in the n+1 row and the n−1 rows may also be illuminated by beam 219. Additionally, the RFID tag associated with the flotation device at seat B in the n+1 row may not yet be illuminated while the B seat in the n−1 row may still be illuminated by beam 219. As reader 202 is traversed in direction 408 along path 26, each seat in a cluster of seats is illuminated in an order determined by the seating configuration of the seat cluster. Using a position of reader 202 from rotary position transducer 216 each first response received from the RFID tags is position stamped or otherwise accounted. The position-stamped responses are correlated to the seating configuration for the aircraft being scanned to determine which seat 22 each response is associated with. In one embodiment, reader 202 automatically modulates beam 219 dynamically during a scan to ensure each RFID tag is read and identified. Responses from tags are associated with a given seat cluster and it may not be possible to singulate responses from tags associated with a given seat cluster to their relative position within the seat cluster. Accordingly, a set of tags is associated with a particular seat cluster.

In other embodiments, it is assumed that seat closest to reader 202 is associated with a larger value of higher RSSI and a smaller value of Time of Arrival (TOA) when compared to a seat farther away from reader 202. A Relative location of a seat within a seat cluster is determined by RSSI and TDOA values derived from measured time of arrival (TOA) values respectively. To facilitate determining a location of the RFID tags associated with each seat, reader 202 controls RF beamwidth, link budget, and propagation characteristics to the fidelity level desired to yield discriminating RSSI and TOA signatures from each RFID tag read within the seat cluster being scanned.

In one other embodiment, the RSSI associated with the RFID tags provides a measure of the energy observed at antenna 210. In the exemplary embodiment, the RSSI is used as a relative measure if signal strength having a value from for example, 0 to 255 when using an 8-bit value. Propagation loss is given by the equation:

$$L = r^n (4\pi)^2 / \lambda^2, \text{ where} \quad (1)$$

r represents the distance between RFID reader 202 and an RFID Tag such as, D1, D2, and D3;

$\lambda$ represents the wavelength at an operating frequency of reader 202, for example, UHF 915 MHz, which is approximately 12.1 inches; and n, ranges between 2 to 4.

In the exemplary embodiment, the variation of n in equation 1 is based on the radio frequency (RF) environment characteristics, for example, RF characteristics of the airplane interior resonant cavity. Another example is that different wall materials have different reflectivity and absorption characteristics for RF and therefore n is a function of the environment within which RF waves propagate. When one does not have direct line of sight and one has to rely on multipath for the transmitter signal to be detected by the receiver then one would expect the n value to be higher and extent is determined by the type of material the RF waves bounce against.

Due to propagation loss the RSSI at distance D3 is greater than the RSSI at distance D2 and the RSSI at distance D2 is greater than the RSSI at distance D1. The RSSI value differential facilitates determining the relative location of Seats A, B, and C for a given row.

In another embodiment, the TOA provides a measure of the distance between RFID reader 202 and the RFID tag. The TOA comprises a round-trip propagation delay between RFID reader 202 and the RFID tag, computation time for the RFID tag to receive and respond to the interrogation command, a transmission duration from RFID reader 202 to the RFID tag plus a transmission duration from the RFID tag to RFID reader 202. In the exemplary embodiment, the TOA measurements are performed during an access command transmission to a singulated RFID tag. The duration is measured from the time the access command is issued by RFID reader 202 to when reader 202 receives the response from the RFID Tag with the assumption that the computation time and transmission duration are substantially equal for all RFID tags. Accordingly, due to the round-trip propagation delay the TOA at distance D3 is less than the TOA at distance D2 and the TOA at distance D2 is less than the TOA at distance D1. The TDOA, determined from measured TOA values, facilitates determining the relative location of Seats A, B, and C for a given row.

The foregoing description of the exemplary embodiments of the invention are described for the purposes of illustration and are not intended to be exhaustive or limiting to the precise embodiments disclosed. Many modifications and variations are possible in light of the above teaching. It is intended that the scope of the invention be limited not with this detailed description, but rather by the claims appended hereto.

The above-described methods and systems for identifying and locating objects such as aircraft flotation devices are cost-effective and highly reliable. The system permits automatically detecting and identifying each of a plurality of objects. Accordingly, the methods and systems described herein facilitate operation of vehicles including aircraft in a cost-effective and reliable manner.

Exemplary embodiments of systems for identifying aircraft flotation devices are described above in detail. The components of these systems are not limited to the specific embodiments described herein, but rather, components of each system may be utilized independently and separately from other components described herein. Each components of each system can also be used in combination with other component identifying systems.

While the invention has been described in terms of various specific embodiments, those skilled in the art will recognize that the invention can be practiced with modification within the spirit and scope of the claims.

What is claimed is:

1. An automated inspection system, the system comprising:
   a reader comprising a transmit portion and a receive portion, said reader physically translatable along a predetermined path;
   a sensor mote coupled to an object to be inspected;
   a directional antenna communicatively coupled to said reader, said antenna configured to transmit and receive signals from said sensor mote in a direction substantially normal to the path;
   a relative position indicator configured to determine a relative position of the reader from a starting point; and
   a controller communicatively coupled to said reader, said controller comprising:
      a user interface;
      a processor communicatively coupled to said user interface; and
      a database communicatively coupled to said processor, said database comprising location data of a plurality of sensor motes in a plurality of different types of vehicles, said processor configured to control the transmitted sensor signals based on the location data.

2. A system in accordance with claim 1 wherein said sensor motes comprise an RFID enabled tag.

3. A system in accordance with claim 1 wherein said reader comprises a radio frequency identification (RFID) reader.

4. A system in accordance with claim 1 wherein said reader is configured to transmit and receive in the UHF band.

5. A system in accordance with claim 1 wherein said reader is configured to generate radio frequency signals of approximately 915 MHz.

6. A system in accordance with claim 1 wherein said reader comprises an RFID reader configured to generate radio frequency signals that interrogate an RFID enabled tag such that the tag responds to the interrogation with a tag identification signal.

7. A system in accordance with claim 1 wherein said directional antenna comprises a passive directional antenna.

8. A system in accordance with claim 7 wherein said passive directional antenna comprises at least one of a Yagi-Uda type antenna, a spiral, and a horn type antenna.

9. A system in accordance with claim 1 wherein said directional antenna comprises an active directional antenna.

10. A system in accordance with claim 9 wherein said active directional antenna comprises a phased-array antenna.

11. A system in accordance with claim 1 wherein said directional antenna is configured to generate a narrow beamwidth selected to ensure that the tags are within the field of view of the antenna beam.

12. A system in accordance with claim 1 wherein said directional antenna is configured to generate a beamwidth of approximately ten degrees to approximately twenty-five degrees.

13. A system in accordance with claim 12 wherein said directional antenna is configured to generate a beamwidth of approximately seventeen degrees.

14. A system in accordance with claim 1 wherein said processor is configured to receive a received signal strength indicator (RSSI) signal from said reader.

15. A system in accordance with claim 14 wherein said processor is configured to determine an RFID-enabled tag location based on, the relative position of the reader, and the received RSSI signal from the reader.

16. A system in accordance with claim 1 wherein said processor is configured to receive a time difference of arrival (TDOA) signal from said reader.

17. A system in accordance with claim 16 wherein said processor is configured to determine a mote location based on, the relative position of the reader, and the TDOA signal from the reader.

18. A system in accordance with claim 1 wherein said processor is configured to position-stamp a plurality of received signals using corresponding relative position signals from said relative position indicator.

19. A system in accordance with claim 18 wherein said processor is configured to determine a mote location based on the position-stamps of the plurality of received RF signals.

20. A system in accordance with claim 1 wherein said relative position indicator comprises a rotary encoder.

21. A system in accordance with claim 1 wherein said database comprises a seating configuration for an aircraft.

22. A method for automated location of an object, said method comprising:
   traversing a reader in a first direction along a path adjacent the object;
   recording a relative position of the reader along the path, the relative position with respect to a starting position of the reader;
   transmitting an interrogation signal from the reader in a direction substantially normal to the first direction;
   transmitting a response signal from the object when the object receives the interrogation signal; and
   determining a presence of the object, an identification of the object and a location of the object based on the response signal.

23. A method in accordance with claim 22 further comprising coupling a mote to the object.

24. A method in accordance with claim 22 wherein traversing a reader in a first direction along a path adjacent the object comprises traversing the reader along an aisle between passenger seats of an aircraft cabin, said object including an RFID-enabled life vest associated with a seat.

25. A method in accordance with claim 22 wherein transmitting an interrogation signal from the reader comprises transmitting the interrogation signal from a directional antenna oriented in the normal direction.

26. A method in accordance with claim 22 wherein transmitting an interrogation signal from the reader comprises transmitting the response signal from the object when the object receives the interrogation signal 27. A method in accordance with claim 26 wherein transmitting a response signal from the object when the object receives the interrogation signal comprises transmitting an identification of the object to the reader in response to the interrogation signal.

28. A method in accordance with claim 26 further comprising:
position-stamping the response signal from the object with position information of the reader with respect to a starting point of the reader, wherein the response signal includes an identification of the object; and
storing the position stamped object identification information.

29. A method in accordance with claim 22 wherein the reader includes a user interface including a display, said method further comprising:
receiving an identification of a location of the reader;
determining a layout configuration for the identified location;
displaying the layout configuration for the identified location;
positioning the reader at the starting position at the location; and
initializing the reader display to display the reader position at the starting position on the displayed layout configuration.

30. A method in accordance with claim 22 wherein transmitting an interrogation signal from the reader comprises intermittently transmitting the interrogation signal from the reader based on a predetermined time period.

31. A method in accordance with claim 22 wherein transmitting an interrogation signal from the reader comprises intermittently transmitting the interrogation signal from the reader based on a predetermined reader position along the path.

32. A method in accordance with claim 22 wherein determining a presence of the object, an identification of the object and a location of the object based on the response signal comprises determining the location of the object using a propagation loss of the transmitted response signal.

33. A method in accordance with claim 22 wherein determining a presence of the object, an identification of the object and a location of the object based on the response signal comprises determining the location of the object using a difference of the time of arrival of a first and a second transmitted response signal.

34. A method in accordance with claim 22 wherein determining a presence of the object, an identification of the object and a location of the object based on the response signal comprises determining the location of the object using a position stamp of each object transmitting a response signal.

35. A method in accordance with claim 22 further comprising displaying the determined objects on the layout configuration in a position indicting a determined location.

36. An automated safety device inspection system for a vehicle, the system comprising:
a radio frequency identification (RFID) reader comprising
a transmit portion and a receive portion, said reader physically translatable along a predetermined path, said RFID reader is configured to generate radio frequency signals that interrogate an RFID enabled tag such that the tag responds to the interrogation with a tag identification signal;
a directional antenna communicatively coupled to said reader, said antenna configured to transmit and receive radio frequency (RF) signals in a direction substantially normal to the path, said directional antenna further configured to generate a narrow beamwidth selected to ensure that the tags are within the field of view of the antenna beam;
a relative position indicator configured to determine a relative position of the reader from a starting point; and
a controller communicatively coupled to said reader, said controller comprising:
a user interface;
a processor communicatively coupled to said user interface, said processor is configured to determine an RFID-enabled tag location based on the relative position of the reader and a received signal strength indicator (RSSI) signal received from the reader, said processor is further configured to determine the RFID-enabled tag location based on the relative position of the reader, and a time difference of arrival (TDOA) signal from the reader, said processor is still further configured to determine the RFID-enabled tag location based on the position-stamps of the plurality of received RF signals; and
a database communicatively coupled to said processor, said database comprising location data of a plurality of safety devices in a plurality of different types of vehicles, said processor configured to control the transmitted RF signals based on the location data.

37. A system in accordance with claim 36 wherein said directional antenna further configured to generate a beamwidth of approximately ten degrees to approximately twenty-five degrees.

38. A system in accordance with claim 37 wherein said directional antenna is configured to generate a beamwidth of approximately seventeen degrees.

* * * * *